United States Patent
St. Mary et al.

(10) Patent No.: US 10,161,407 B2
(45) Date of Patent: Dec. 25, 2018

(54) RADIAL FASTENING OF TUBULAR SYNCHRONIZING RINGS

(71) Applicant: United Technologies Corporation, Hartford, CT (US)

(72) Inventors: Christopher St. Mary, Hebron, CT (US); Eugene C. Gasmen, Rocky Hill, CT (US); Bernard W. Pudvah, Portland, CT (US)

(73) Assignee: United Technologies Corporation, Farmington, CT (US)

( * ) Notice: Subject to any disclaimer, the term of this patent is extended or adjusted under 35 U.S.C. 154(b) by 529 days.

(21) Appl. No.: 14/893,149

(22) PCT Filed: May 22, 2014

(86) PCT No.: PCT/US2014/039087
§ 371 (c)(1),
(2) Date: Nov. 23, 2015

(87) PCT Pub. No.: WO2014/200680
PCT Pub. Date: Dec. 18, 2014

(65) Prior Publication Data
US 2016/0123339 A1     May 5, 2016

Related U.S. Application Data

(60) Provisional application No. 61/835,046, filed on Jun. 14, 2013.

(51) Int. Cl.
*F01D 17/16*     (2006.01)
*F04D 27/00*     (2006.01)
(Continued)

(52) U.S. Cl.
CPC ......... *F04D 27/002* (2013.01); *F01D 17/162* (2013.01); *F01D 17/20* (2013.01);
(Continued)

(58) Field of Classification Search
CPC ... F01D 17/162; F04D 29/563; F04D 27/0246
See application file for complete search history.

(56) References Cited

U.S. PATENT DOCUMENTS 4,755,104 A    7/1988   Castro et al.
5,024,580 A    6/1991   Olive
(Continued)

OTHER PUBLICATIONS

International Preliminary Report on Patentabilty for International Application No. PCT/US2014/039087 dated Dec. 23, 2015.
(Continued)

*Primary Examiner* — Jason Shanske
*Assistant Examiner* — Sabbir Hasan
(74) *Attorney, Agent, or Firm* — Carlson, Gaskey & Olds, P.C.

(57) ABSTRACT

A synchronizing ring assembly for a variable guide vane system is disclosed. The synchronizing ring assembly is disposed about an engine axis and includes a synchronizing ring having a radially outer surface with a clevis bracket mounted to the radially outer surface of the synchronizing ring and defining radially extending openings through the clevis bracket. A plurality of fasteners are configured and adapted to be received within the radially extending openings in the clevis bracket for securing the clevis bracket to the radially outer surface of the synchronizing ring.

12 Claims, 5 Drawing Sheets

(51) Int. Cl.
- *F02K 3/06* (2006.01)
- *F04D 29/56* (2006.01)
- *F04D 29/64* (2006.01)
- *F01D 17/20* (2006.01)
- *F04D 19/00* (2006.01)

(52) U.S. Cl.
CPC ............... *F02K 3/06* (2013.01); *F04D 19/00* (2013.01); *F04D 29/563* (2013.01); *F04D 29/644* (2013.01); *F05D 2260/50* (2013.01)

(56) References Cited

U.S. PATENT DOCUMENTS

| | | |
|---|---|---|
| 5,387,080 A | 2/1995 | Bouhennicha et al. |
| 5,549,448 A * | 8/1996 | Langston .............. F01D 17/162 29/889.2 |
| 6,092,984 A | 7/2000 | Bouyer |
| 6,413,043 B1 | 7/2002 | Bouyer |
| 6,688,846 B2 | 2/2004 | Caubet et al. |
| 7,588,415 B2 | 9/2009 | Giaimo et al. |
| 7,901,178 B2 | 3/2011 | Giaimo et al. |
| 8,328,512 B2 | 12/2012 | Major et al. |
| 2005/0129510 A1 | 6/2005 | Raine et al. |
| 2007/0292264 A1 | 12/2007 | Bouru |
| 2012/0195751 A1 | 8/2012 | Gasmen et al. |

OTHER PUBLICATIONS

International Search Report and Written Opinion for International Application No. PCT/US2014/039087 dated Sep. 22, 2014.

\* cited by examiner

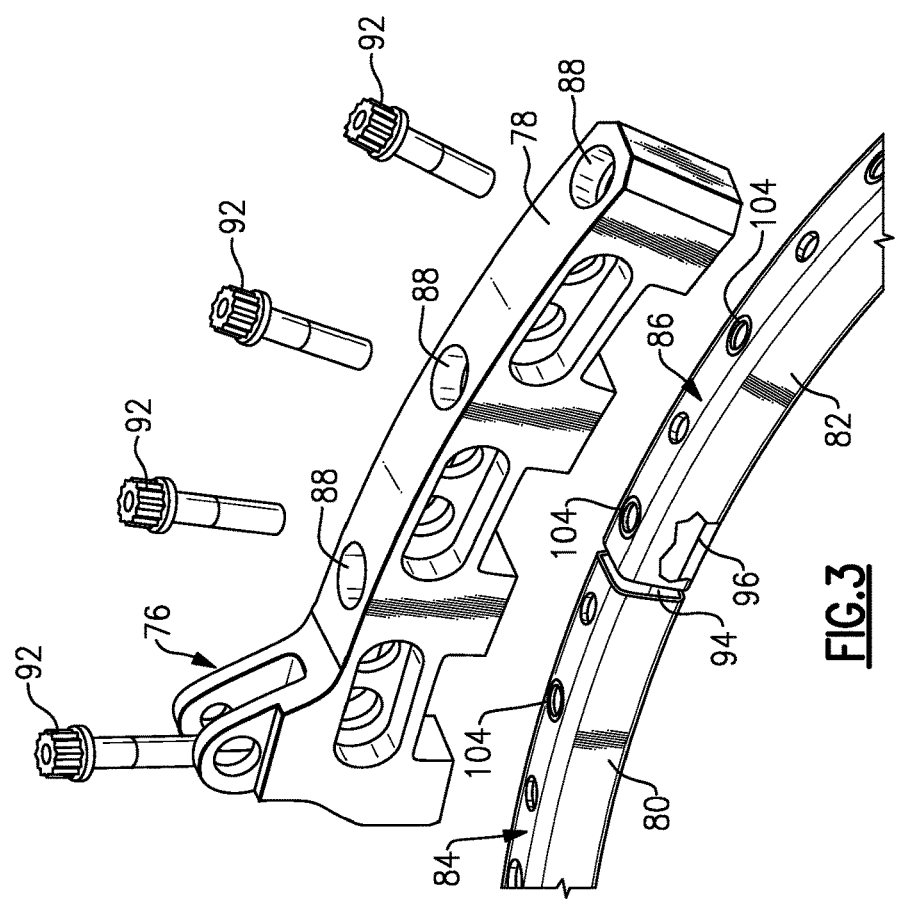
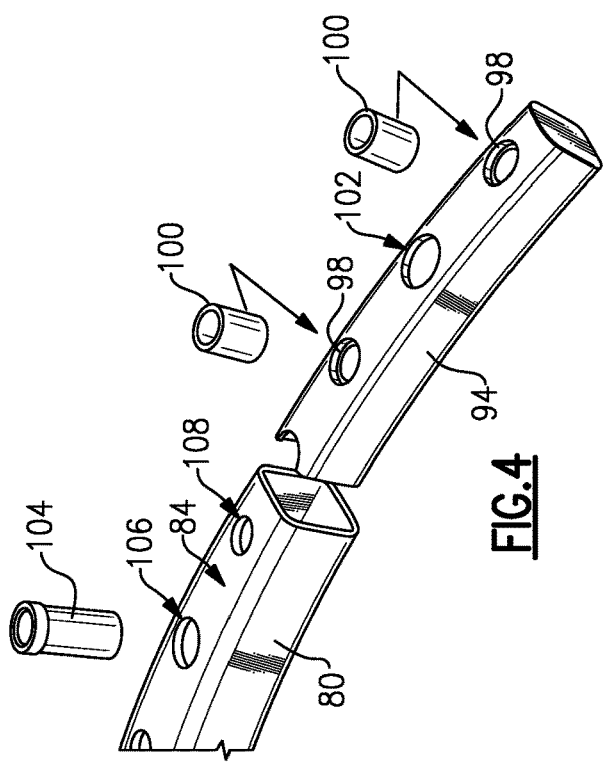
FIG.3
FIG.4

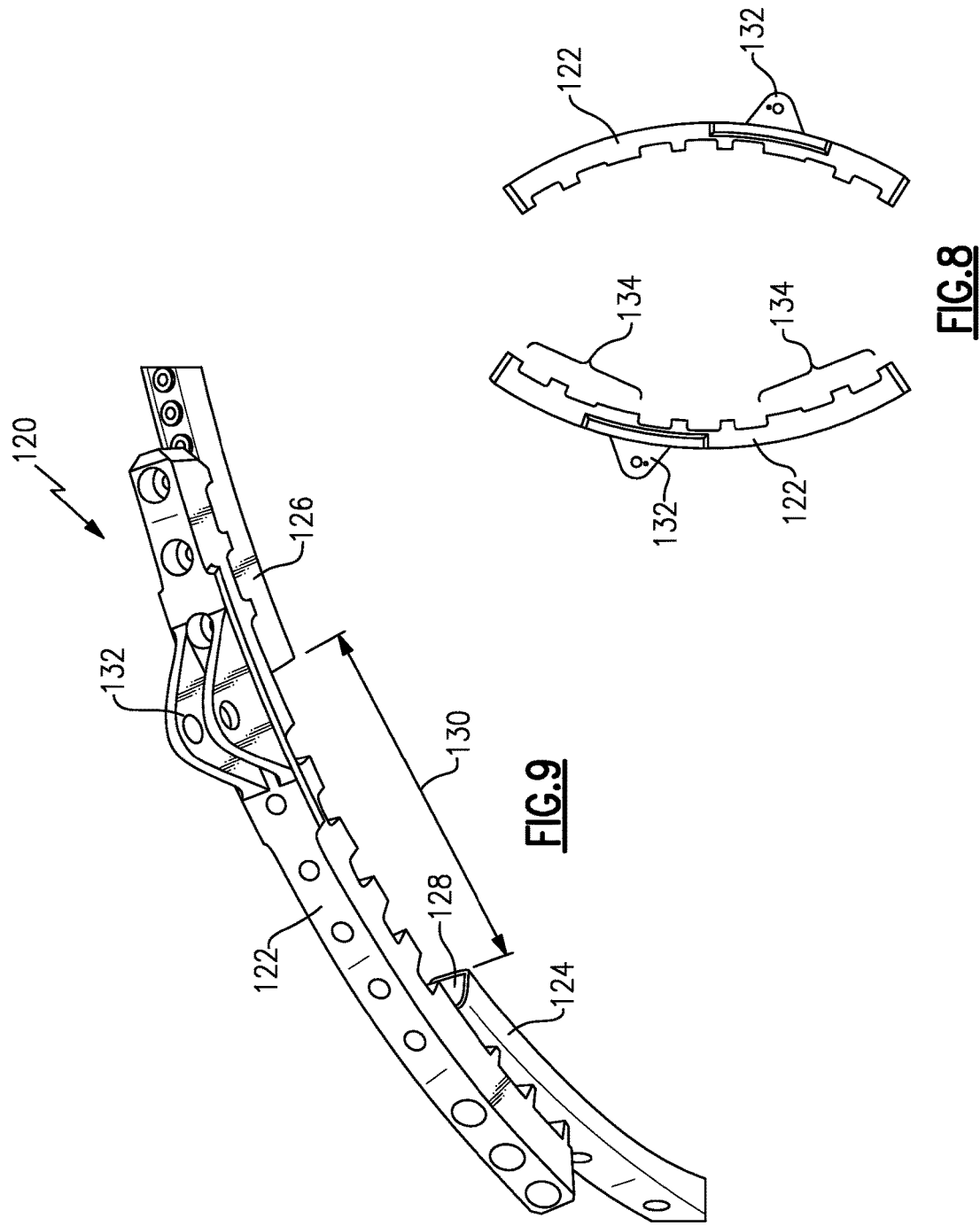

RADIAL FASTENING OF TUBULAR SYNCHRONIZING RINGS

CROSS REFERENCE TO RELATED APPLICATION

This application claims priority to U.S. Provisional Application No. 61/835,046 filed Jun. 14, 2013.

BACKGROUND

A gas turbine engine typically includes a fan section, a core engine section including a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Each of the compressor sections includes several stages, with each stage including rotating blades and non-rotating stator vanes. The stator vanes may be pivotable to enable rotation about an axis extending radially from the engine centerline. The variable position stator vanes are movable to change airflow through the compressor section to enhance compressor performance.

A synchronizing ring is provided about the vane stage to coordinate movement of all the vanes within a common stage. A vane arm is attached between each vane and the synchronizing ring. An actuator is utilized to rotate the entire synchronizing ring to facilitate movement and adjustment of each vane within the stage. The synchronizing ring is typically formed of several arcuate sections attached to each other to form a continuous ring about the vane stage.

Access to the synchronizing ring is limited and may require disassembly of other surrounding engine components. Engine manufacturers continually seek systems and procedures that ease assembly and maintenance.

SUMMARY

A synchronizing ring assembly for a variable guide vane system disposed about an engine axis according to an exemplary embodiment of this disclosure, among other possible things includes a synchronizing ring having at least one radially outer surface, at least one clevis bracket is mounted to the at least one radially outer surface of the synchronizing ring and defining radially extending openings through the clevis bracket. A plurality of fasteners is configured and adapted to be received within the radially extending openings in the at least one clevis bracket for securing the at least one clevis bracket to the at least one radially outer surface of the synchronizing ring.

In a further embodiment of the foregoing synchronizing ring assembly, the synchronizing ring includes a first ring segment and a second ring segment coupled to one another by the at least one clevis bracket.

In a further embodiment of any of the foregoing synchronizing ring assemblies, the at least one radially outer surface of the synchronizing ring includes a first radially outer surface defined by the first ring segment and a second radially outer surface defined by the second ring segment, and the at least one clevis bracket is mounted to the first and second radially outer surfaces.

In a further embodiment of any of the foregoing synchronizing ring assemblies, further includes a first insert configured and adapted to be received within the first ring segment and a second insert configured and adapted to be received within the second ring segment. The first insert and the second insert include threaded portions for engaging threads of the plurality of fasteners to secure the at least one clevis bracket to the first and second ring segments.

In a further embodiment of any of the foregoing synchronizing ring assemblies, the threaded portions are installed into the first and second inserts.

In a further embodiment of any of the foregoing synchronizing ring assemblies, further includes a bushing extending through at least one of the first ring segment and the second ring segment and a corresponding one of the first insert and the second insert.

In a further embodiment of any of the foregoing synchronizing ring assemblies, further includes a vane arm pin extending through the at least one bushing.

In a further embodiment of any of the foregoing synchronizing ring assemblies, the at least one bushing secures at least one of the first insert and the second insert into a corresponding one of the first ring segment and the second ring segment.

In a further embodiment of any of the foregoing synchronizing ring assemblies, includes a plurality of guide vanes operably attached to the first and second ring segments for pivoting about a corresponding plurality of radially extending pivot axes.

In a further embodiment of any of the foregoing synchronizing ring assemblies, each of the plurality of guide vanes is disposed within a compressor section of the engine.

In a further embodiment of any of the foregoing synchronizing ring assemblies, each of the plurality of guide vanes is disposed within a bypass passage of the engine.

A compressor assembly for a gas turbine engine according to an exemplary embodiment of this disclosure, among other possible things includes at least one rotor supporting rotation of a plurality of blades about an engine axis, at least one vane section including a plurality of vanes pivotable about a corresponding plurality of radial axes extending from the engine axis, and a synchronizing ring assembly driven by an actuator and linked to the plurality of vanes for moving the vanes about the plurality of radial axes. The synchronizing ring assembly includes at least one radially outer surface. At least one clevis bracket is mounted to the at least one radially outer surface of the synchronizing ring and defining radially extending openings through the clevis bracket. A plurality of fasteners are configured and adapted to be received within the radially extending openings in the at least one clevis bracket for securing the at least one clevis bracket to the at least one radially outer surface of the synchronizing ring.

In a further embodiment of the foregoing compressor assembly, the synchronizing ring includes a first ring segment and a second ring segment coupled to one another by the at least one clevis bracket.

In a further embodiment of any of the foregoing compressor assemblies, the at least one radially outer surface of the synchronizing ring includes a first radially outer surface defined by the first ring segment and a second radially outer surface defined by the second ring segment, and the at least one clevis bracket is mounted to the first and second radially outer surfaces.

In a further embodiment of any of the foregoing compressor assemblies, further includes a first insert configured and adapted to be received within the first ring segment and a second insert configured and adapted to be received within the second ring segment. The first insert and the second insert include threaded portions for engaging threads of the plurality of fasteners securing the at least one clevis bracket to the first and second ring segments.

In a further embodiment of any of the foregoing compressor assemblies, the threaded portions are installed into one of the first insert and the second insert.

A turbofan engine assembly according to an exemplary embodiment of this disclosure, among other possible things includes a fan including a plurality of fan blades rotatable about an axis, a compressor section, a combustor in fluid communication with the compressor section, a turbine section in fluid communication with the combustor, at least one vane section including a plurality of vanes pivotable about a corresponding plurality of radial axes extending from the axis, and a synchronizing ring assembly driven by an actuator and linked to the plurality of vanes for moving the vanes corresponding ones of the plurality of radial axes. The synchronizing ring includes, a first ring segment including a first radially outer surface, a second ring segment including a second radially outer surface, at least one clevis bracket mounted to the first radially outer surface of the first ring segment and the second radially outer surface of the second ring segment, the at least one clevis bracket including radially extending openings through the clevis bracket, and a plurality of fasteners received within the radially extending openings in the at least one clevis bracket for securing the at least one clevis bracket to the first and second radially outer surfaces of the first and second ring segments.

In a further embodiment of the foregoing compressor assembly, includes a first insert configured and adapted to be received within the first ring segment and a second insert configured and adapted to be received within the second ring segment. The first insert and the second insert include threaded portions for engaging threads of the plurality of fasteners securing the at least one clevis bracket to the first and second ring segments.

In a further embodiment of any of the foregoing compressor assemblies, the threaded portions are installed into the first insert and the second inserts.

In a further embodiment of any of the foregoing compressor assemblies, includes a bushing extending through at least one of the first ring segment and the second ring segment and a corresponding one of the first insert and the second insert. The at least one bushing secures at least one of the first insert and the second insert into a corresponding one of the first ring segment and the second ring segment.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 3 is an exploded view of the example synchronizing ring assembly.

FIG. 4 is an exploded view of an insert received within a segment of the synchronizing ring assembly.

FIG. 8 is a side view of another example clevis bracket.

FIG. 9 is another example of a synchronizing ring assembly including the example clevis bracket of FIG. 8.

DETAILED DESCRIPTION

Figure 1:
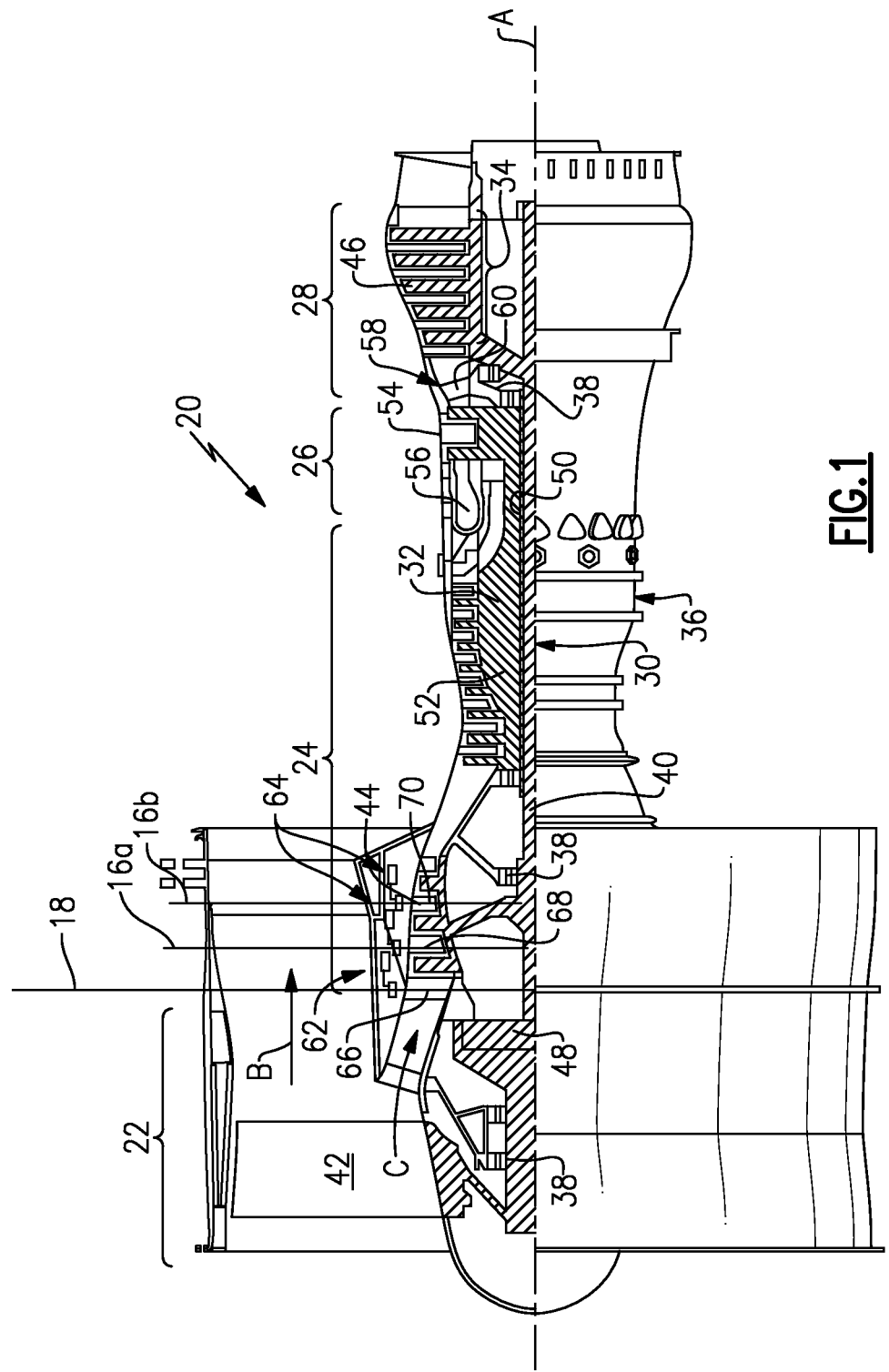
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44, then by the high pressure compressor 52, then mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42, which comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors, schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22. Therefore, the relationship between the number of turbine rotors 34 in the low pressure turbine 46 and the number of blades 42 in the fan section 22 impacts power transfer efficiency in the gas turbine engine.

The example engine 20 includes a variable inlet guide vane system 62 that provides for movement of at least one vane 66. The variable inlet guide vane system 62 provides for the pivoting of vanes 66 to alter and change the direction of airflow proceeding through the core airflow path C. The variable inlet guide vane system 62 includes a plurality of variable inlet guide vanes 66 (only one shown) that each pivot about a respective radial axis 18 extending radially from the engine axis A.

The example low pressure compressor 44 includes a variable guide vane system 64 with first and second vane stages 68, 70. Each of the vane stages 68, 70 includes a plurality of vanes that are movable about respective corresponding radial axes 16a and 16b extending radially from the engine axis A. Although only two variable vane stages are illustrated for the variable guide vane system 64, additional vane stages may also be provided to tailor compressor operation to improve engine efficiency. Moreover, although the variable guide vane system 64 is shown as part of the low pressure compressor 44, it is within the contemplation of this disclosure that the guide vane system may also be part of the high pressure compressor 52 or other compressor sections of a gas turbine engine.

Figure 2:
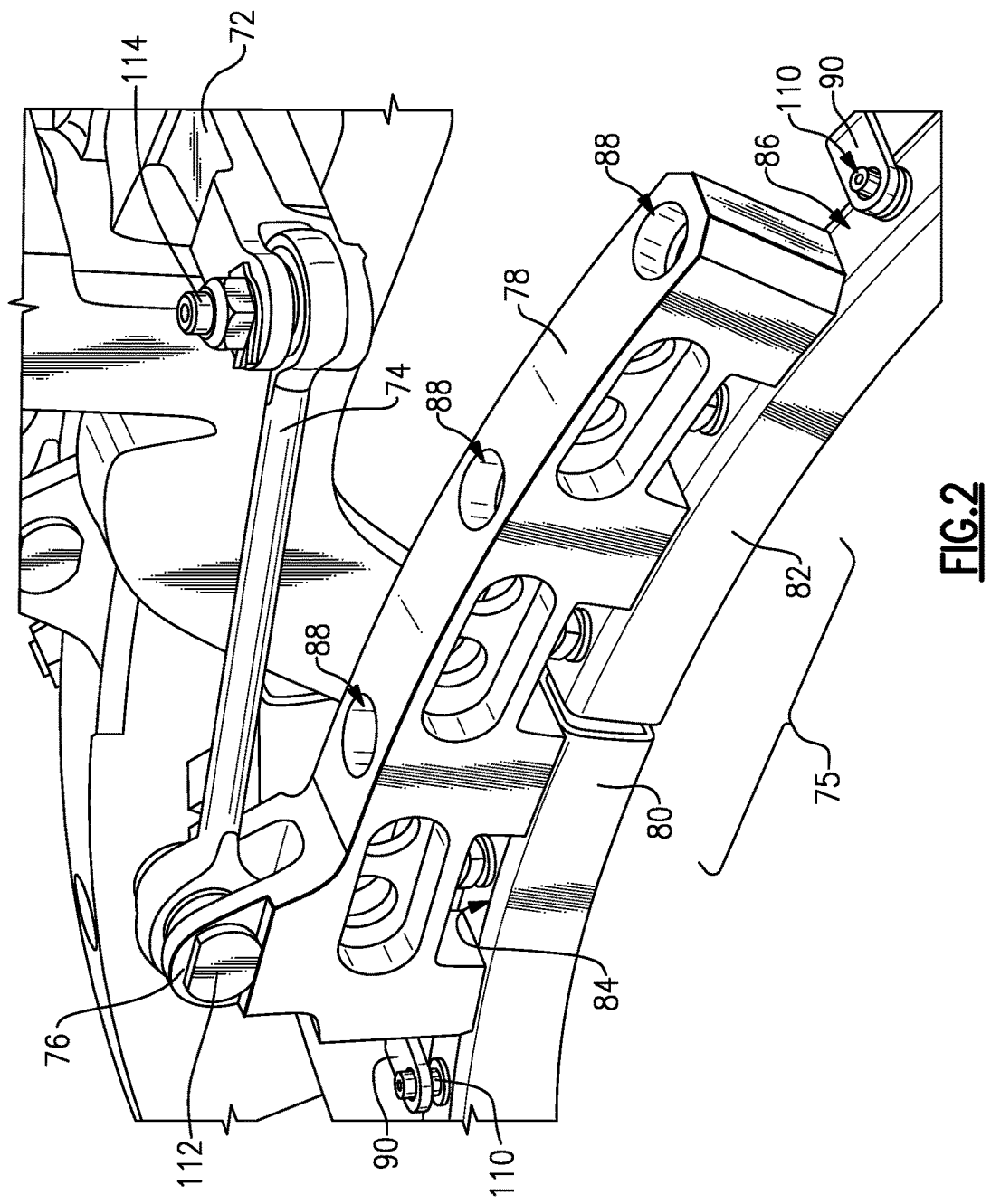
FIG. 2 is a perspective view of an example synchronizing ring assembly.

Referring to FIG. 2 with continued reference to FIG. 1, the example guide vane system 62 includes the plurality of vanes 66 disposed radially about the engine axis A within the core airflow path C. Each of the vanes 66 is pivoted about a corresponding radial axis 18 by way of an actuation mechanism. The actuation mechanism includes at least one actuator 72 that drives a link 74 attached to a synchronizing ring 75. The link 74 is attached to a clevis 76 on a clevis bracket 78 by a first pivoting pin connection 112 and to the actuator 72 with a second pivoting pin connection 114.

The synchronizing ring 75 includes a first segment 80 and a second segment 82 that are attached to each other by way of the clevis bracket 78. The first segment 80 includes a first radially outer surface 84 and the second segment 82 includes a second radially outer surface 86. The clevis bracket 78 includes a clevis 76 that is pivotally attached to the link 74 driven by the actuator 72. The clevis bracket 78 is secured to the corresponding first and second radially outer surfaces 84, 86 to secure the first and second segments 80, 82 to each other.

The example synchronizing ring 75 includes the first segment 80 attached to the second segment 82 to encircle the engine axis A proximate to the vanes 66. A vane arm 90 is pivotally attached to the synchronizing ring 75 to translate rotational movement to the vanes 66. The synchronizing ring 75 is rotated by the actuator 72 to provide a corresponding rotation of the vane arms 90 that provides the desired pivoting movement of the vanes 66. The vane arms 90 are secured to the synchronizing ring 75 by way of vane arm pins 110.

Referring to FIGS. 3 and 4 with continued reference to FIG. 2, the first segment 80 is attached to the second segment 82 with the clevis bracket 78. The example clevis bracket 78 includes openings 88 for fasteners 92 that extend radially relative to the engine axis A. The fasteners 92 extend through the corresponding opening 88 and into corresponding threaded helicoils 100 that are disposed within one of a first and second insert 94, 96. The clevis bracket 78 is secured to the radially outer surfaces 84, 86 of corresponding first and second segments 80, 82.

The first segment 80 receives the first insert 94 and the second segment 82 receives the second insert 96. The first and second segments 80 and 82 are arcuate tubular members which have square cross sections and define respective inner cavities, each configured to receive a corresponding one of the first and second inserts 94, 96. The insert 94 includes openings 98 that receive threaded helicoils 100. The threaded helicoils 100 provide the threaded interface that engage the threaded fasteners 92 and secure the clevis bracket 78 to the first and second segments 80, 82. The threaded fasteners 92 are thereby inserted radially through the openings 88 within the clevis bracket 78, through openings 108 in the corresponding first and second segment 80, 82 and engaged to the threads of the helicoil 100 disposed within the opening 98 of the inserts 94, 96.

Each of the first and second inserts 94, 96 includes an opening 102 for receiving a bushing 104. The opening 102 and bushing 104 are provided to receive the corresponding vane arm pins 110. The bushings 104 provide a clearance fit to allow rotation and movement of the vane pins 110 within the bushing 104.

The bushing 104 is also utilized to secure the first insert 94 within the first segment 80. The bushing 104 is inserted through an opening 106 in the first segment 80 and received within the opening 102 disposed within the first insert 94. The bushing 104 is then deformed to engage and become fixed to the first segment 80. Because the bushing 104 is secured and deformed to remain within the first segment 80, it maintains the insert 94 within the first segment 80. Similarly, the second insert 96 is secured within the second segment 80 with another bushing 104.

Figure 6:
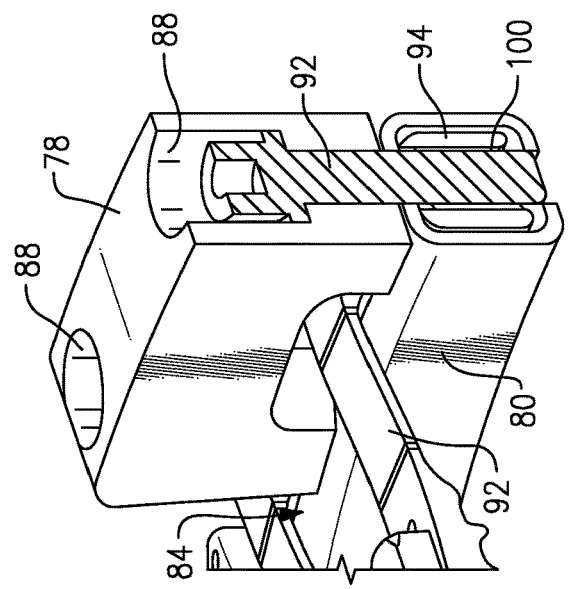
FIG. 6 is a sectional view of a portion of a clevis bracket attached to a segment of the synchronizing ring assembly.
Figure 5:
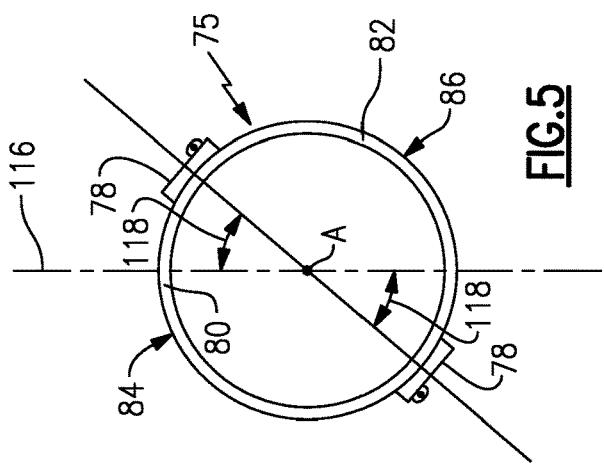
FIG. 5 is a schematic view of the synchronizing ring assembly.
Figure 7:
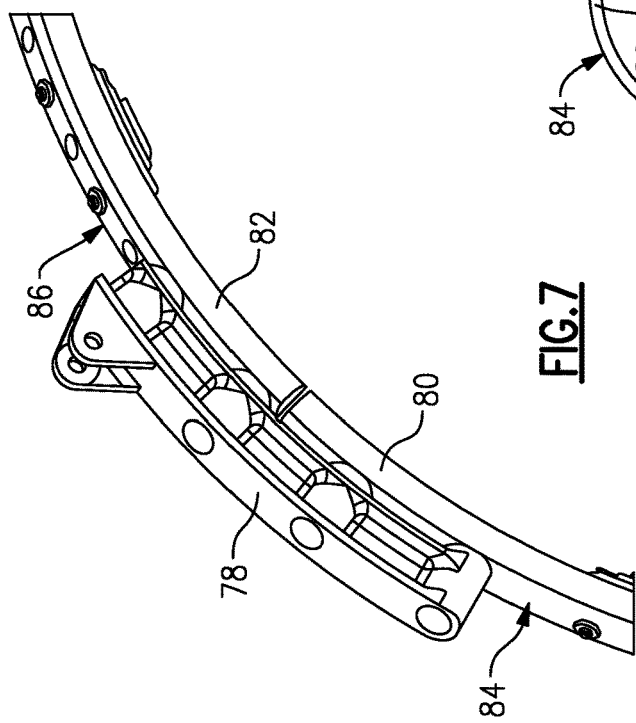
FIG. 7 is a perspective view of the example clevis bracket attached to the synchronizing ring segments.

Referring to FIGS. 5, 6 and 7 with continued reference to FIG. 2, the example clevis bracket 78 secures the first segment 80 to the second segment 82 to form the continuous synchronizing ring 75 about the engine axis A. In this embodiment, the first segment 80 and the second segment 82 are joined at an interface disposed at an angle 118 from a radial line extending transverse through the engine axis A and a top center position 116. In this instance, the angle 118 provides for clevis brackets 78 to be disposed at a three o'clock and nine o'clock positions relative to the top center position 116. It will be appreciated that other locations of the clevis bracket 78 may be utilized to actuate the variable integrated guide vane system 62. The clevis bracket 78 is fastened to the first outer radial surface 84 of the first ring segment 80 and the second radial outer surface 86 of the second ring segment 82 with the radially extending fasteners 92 secured to a corresponding helicoil 100.

Referring to FIGS. 8 and 9, another example synchronizing ring assembly 120 is shown that includes a first segment 124 that is attached to a second segment 126 by way of a clevis bracket 122 attached to helicoils disposed within an insert 128. An insert 128 is disposed within each of the first and second segments 124 and 126.

The example clevis bracket 122 includes the clevis 132 for engaging a link of an actuator. In this example, the clevis bracket 122 provides a different configuration from that described above with respect clevis bracket 78. Clevis bracket 122 includes pads 134 that are spaced apart a circumferential distance 130. The example circumferential distance 130 is provided between the pads 134. The pads 134 are utilized to receive threaded fasteners that secure the clevis bracket 122 to the radial outer surface of segments 124, 126. The distance 130 can be utilized to accommodate other structures and to provide adjustment of common synchronizing ring segments for different positions or locations.

Accordingly, the disclosed synchronizing rings 75, 120 utilize a clevis bracket 78,122 secured with fasteners 92 that extend radially through the clevis bracket 78 and into a radially outer surface of the corresponding synchronizing ring segments 80, 82, 124,126. Assembly of the fasteners 92 in the radial direction provides access to the fasteners through a radially accessible surface instead of axial surfaces that are difficult to access. The radial access to the fasteners 92 therefore simplifies assembly and disassembly while maintaining the required synchronizing ring structure and operation.

Accordingly, the example synchronizing ring assemblies disclosed herein ease assembly and provides a simplified synchronizing ring structure for implementation in turbofan variable vane systems.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A synchronizing ring assembly for a variable guide vane system disposed about an engine axis, the synchronizing ring assembly comprising:
    a synchronizing ring having at least one radially outer surface, a first ring segment and a second ring segment;
    at least one clevis bracket mounted to the at least one radially outer surface of the synchronizing ring and defining radially extending openings through the at least one clevis bracket, wherein the first ring segment and the second ring segment are coupled to each other by the at least one clevis bracket;
    a plurality of fasteners configured and adapted to be received within the radially extending openings in the at least one clevis bracket for securing the at least one clevis bracket to the at least one radially outer surface of the synchronizing ring; and
    a first insert configured and adapted to be received within the first ring segment and a second insert configured and adapted to be received within the second ring segment, wherein the first insert and the second insert each includes include threaded portions for engaging threads of the plurality of fasteners to secure the at least one clevis bracket to the first and second ring segments.

2. The synchronizing ring assembly as recited in claim 1, wherein the at least one radially outer surface of the synchronizing ring includes a first radially outer surface defined by the first ring segment and a second radially outer surface defined by the second ring segment, and the at least one clevis bracket is mounted to the first and second radially outer surfaces.

3. The synchronizing ring assembly as recited in claim 1, further comprising at least one bushing extending through at least one of the first ring segment and the second ring segment and the first insert and the second insert.

4. The synchronizing ring assembly as recited in claim 3, further comprising a vane arm pin extending through the at least one bushing.

5. The synchronizing ring assembly as recited in claim 3, wherein the at least one bushing secures the first insert and the second insert into a corresponding one of the first ring segment and the second ring segment.

6. The synchronizing ring assembly as recited in claim 1, including a plurality of guide vanes operably attached to the first and second ring segments for pivoting about a corresponding plurality of radially extending pivot axes.

7. The synchronizing ring assembly as recited in claim 6, wherein each of the plurality of guide vanes is disposed within a compressor section of an engine.

8. A compressor assembly for a gas turbine engine, the compressor assembly comprising:
   at least one rotor supporting rotation of a plurality of blades about an engine axis;
   at least one vane section including a plurality of vanes pivotable about a corresponding plurality of radial axes extending from the engine axis;
   a synchronizing ring assembly driven by an actuator and linked to the plurality of vanes for moving the vanes about the plurality of radial axes, wherein the synchronizing ring assembly includes at least one radially outer surface, a first ring segment and a second ring segment coupled to one another by at least one clevis bracket mounted to the at least one radially outer surface of the synchronizing ring and defining radially extending openings through the at least one clevis bracket, and a plurality of fasteners configured and adapted to be received within the radially extending openings in the at least one clevis bracket for securing the at least one clevis bracket to the at least one radially outer surface of the synchronizing ring and wherein a first insert is configured and adapted to be received within the first ring segment and a second insert configured and adapted to be received within the second ring segment, wherein the first insert and the second insert include threaded portions for engaging threads of the plurality of fasteners securing the at least one clevis bracket to the first and second ring segments.

9. The compressor assembly as recited in claim 8, wherein the at least one radially outer surface of the synchronizing ring includes a first radially outer surface defined by the first ring segment and a second radially outer surface defined by the second ring segment, and the at least one clevis bracket is mounted to the first and second radially outer surfaces.

10. The compressor assembly as recited in claim 8, wherein the threaded portions are installed into one of the first insert and the second insert.

11. A turbofan engine assembly comprising:
   a fan including a plurality of fan blades rotatable about an axis;
   a compressor section;
   a combustor in fluid communication with the compressor section;
   a turbine section in fluid communication with the combustor;
   at least one vane section including a plurality of vanes pivotable about a corresponding plurality of radial axes extending from the axis; and
   a synchronizing ring assembly driven by an actuator and linked to the plurality of vanes for moving the vanes about corresponding ones of the plurality of radial axes, wherein the synchronizing ring assembly includes a first ring segment with a first radially outer surface and a second ring segment with a second radially outer surface, a first insert received within the first ring segment and a second insert received within the second ring segment, each of the first insert and the second insert including threaded portions, at least one clevis bracket mounted to the first radially outer surface and the second radially outer surface of the synchronizing ring and defining radially extending openings through the at least one clevis bracket, and a plurality of fasteners configured and adapted to be received within the radially extending openings in the at least one clevis bracket and the threaded portions of the first insert and the second insert for securing the at least one clevis bracket to the first radially outer surface and the second radially outer surface of the synchronizing ring.

12. The turbofan engine assembly as recited in claim 11, including at least one bushing extending through at least one of the first ring segment and the second ring segment and a corresponding one of the first insert and the second insert, wherein the at least one bushing secures the first insert and the second insert into a corresponding one of the first ring segment and the second ring segment.

* * * * *